UNITED STATES PATENT OFFICE.

CAMPBELL MORFIT, OF LONDON, ENGLAND, ASSIGNOR TO EDWIN POTTER CARPENTER, OF SAME PLACE.

MILK FOOD EXTRACT.

SPECIFICATION forming part of Letters Patent No. 551,134, dated December 10, 1895.

Application filed February 23, 1895. Serial No. 539,467. (No specimens.) Patented in England September 19, 1893, No. 17,630.

*To all whom it may concern:*

Be it known that I, CAMPBELL MORFIT, consulting chemist, of 34 Fairfax Road, Finchley Road, London, England, have invented a new and useful Improvement in Food Products consisting in part of Skim or Separated Milk, of which the following is a specification, and for which I have obtained Letters Patent of Great Britain No. 17,630, dated September 19, 1893.

The object of this invention is to so treat what may be called to some extent a "waste product"—that is to say, skim or separated milk—as to render the same of considerable dietetic value; and the invention consists in adding to the skim or separated milk an oleaginous material, whereby the fat deficiency of the said skim or separated milk is economically supplied, and I obtain a product which becomes in dietetic effect a full milk.

In carrying out my invention a quantity of skim or separated milk is placed in a vacuum-pan and evaporated in the usual way for condensing milk to about one-fourth its original volume, enough sweetening material—say, white sugar—for preserving and blending effect being added either at the beginning or end of the condensing operation.

If one hundred imperial gallons of the milk are treated, the amount of sugar may vary from fifty to two hundred and fifty pounds, according to the purposes for which the product is required. The condensed milk is then transferred to a suitable vessel and a quantity of refined pure oil of cotton-seed is added in proportions of two to ten ounces to the pound, according to the degree of richness required, and the mass is well stirred until it becomes completely homogeneous.

For the market the product is placed in air-tight tins, after the manner of the condensed milk of commerce.

In the product thus obtained the oil becomes so intimately blended with the milk that there is no betrayal of its presence to the eye and but little to the taste, and when mixed with water or fresh skim-milk for use it forms a milk richer in a dietetic sense than even fresh full milk. When thus diluted no immediate separation of the oil will take place; but on being allowed to stand the oil will rise to the surface, taking with it the modicum of cream which has been retained by the milk and will have the appearance and consistence of cream.

The richest form of the product which contains the ten ounces of the oil or equal to about forty per cent. of fat will, when mixed with the skim or separated milk in about the proportion of one volume of product to about ten volumes of fresh skim or separated milk, convert a comparatively waste product into a formidable rival to fresh full milk.

The product will be found useful for many purposes—that is to say, as a food for calves, for cooking, or confectionery, and it may also be used as a substitute for fresh milk by bakers and biscuit manufacturers.

What I claim is—

The food product herein described, consisting of skim milk condensed by evaporation, sugar, and oil of cotton seed, in about the proportions herein specified.

CAMPBELL MORFIT.

Witnesses:
H. K. WHITE,
T. F. BARNES.